United States Patent
Lanin et al.

(10) Patent No.: US 12,205,391 B2
(45) Date of Patent: Jan. 21, 2025

(54) EXTRACTING STRUCTURED INFORMATION FROM DOCUMENT IMAGES

(71) Applicant: ABBYY Development Inc., Dover, DE (US)

(72) Inventors: Mikhail Lanin, Moscow (RU); Stanislav Semenov, Moscow (RU)

(73) Assignee: ABBYY Development Inc., Dover, DE (US)

( * ) Notice: Subject to any disclaimer, the term of this patent is extended or adjusted under 35 U.S.C. 154(b) by 448 days.

(21) Appl. No.: 17/562,471

(22) Filed: Dec. 27, 2021

(65) Prior Publication Data

US 2023/0206671 A1   Jun. 29, 2023

(30) Foreign Application Priority Data

Dec. 23, 2021   (RU) ............................ RU2021138551

(51) Int. Cl.
   *G06V 30/412*   (2022.01)
   *G06V 30/19*    (2022.01)
   *G06V 30/413*   (2022.01)
   *G06V 30/414*   (2022.01)

(52) U.S. Cl.
   CPC ...... *G06V 30/412* (2022.01); *G06V 30/19107* (2022.01); *G06V 30/19173* (2022.01); *G06V 30/413* (2022.01); *G06V 30/414* (2022.01)

(58) Field of Classification Search
   CPC .............. G06V 30/142; G06V 30/143; G06V 30/19107; G06V 30/414; G06V 30/19173
   See application file for complete search history.

(56) References Cited

U.S. PATENT DOCUMENTS

| | | | |
|---|---|---|---|
| 9,268,999 B2 | 2/2016 | Xu et al. | |
| 10,963,632 B2 | 3/2021 | Lin | |
| 10,970,535 B2 | 4/2021 | Mallick et al. | |
| 11,010,543 B1 | 5/2021 | Wesanekar | |
| 2009/0060336 A1* | 3/2009 | Konno | G06V 30/414 382/177 |
| 2016/0104077 A1 | 4/2016 | Jackson, Jr. et al. | |
| 2019/0266394 A1 | 8/2019 | Yu | |
| 2019/0303663 A1* | 10/2019 | Krishnapura Subbaraya | G06V 30/413 |
| 2020/0042785 A1 | 2/2020 | Burdick | |
| 2020/0175267 A1 | 6/2020 | Schafer et al. | |
| 2021/0064861 A1 | 3/2021 | Semenov | |
| 2021/0117668 A1 | 4/2021 | Zhong et al. | |

FOREIGN PATENT DOCUMENTS

RU   2723293 C1   6/2020

* cited by examiner

*Primary Examiner* — Quang N Vo (74) *Attorney, Agent, or Firm* — Lowenstein Sandler LLP (57) ABSTRACT

An example method of extracting structured information from document images comprises: receiving a document image; detecting a tabular structure within the document image; identifying a plurality of rows of the tabular structure, wherein each row of the plurality of rows comprises one or more lines; for each row of the plurality of rows, identifying a set of field types of one or more fields comprised by each line of the one or more lines comprised by the respective row; detecting, in each line of the one or more lines, a set of fields corresponding to a respective set of field types; and extracting information from the set of fields.

20 Claims, 10 Drawing Sheets

Delivery to:
Chevron North Sea Ltd    C/O Asco UK    Shed 9 York Street   ABERDEEN   AB11 5DD   United Kingdom Notes:

| Item | Product Code (other code) | Description and Container | Quantity Sold | Sale unit | Quantity | Price unit | Unit price | Line Total GBP |
|---|---|---|---|---|---|---|---|---|
| 010 | 600681739 | RENOLIN B 15 HVI 20LAPLA | 1 | EA | 1.00 | 1EA | 21.610 | 21.61 |
| 020 | 600046880 | RENOLIT EP 2 400GACRT | 24 | EA | 24.00 | 1EA | 1.690 | 40.56 |
| 030 | 600046873 | RENOLIT EP 2 12.5KAMET | 1 | EA | 1.00 | 1EA | 31.826 | 31.83 |
| 040 | 600518479 | TITAN ATF 4000 20LAPLA | 2 | EA | 2.00 | 1EA | 44.819 | 89.64 |
| 050 | 600518547 | TITAN GEAR HYP SAE 90 20LAPLA | 2 | EA | 2.00 | 1EA | 34.859 | 69.72 |
| 060 | 600663483 | RENOLIN B 46 HVI 20LAPLA | 3 | EA | 3.00 | 1EA | 22.800 | 68.40 |

Total Goods       321.76
Subtotal          321.76
Total VAT @ 20.00%  64.35
Total DUE         386.11 GBP

FIG. 2

Notes:

| Item | Product Code (other code) | Description and Container | Quantity Sold | Sale unit | Quantity | Price unit | Unit price | Line Total GBP |
|---|---|---|---|---|---|---|---|---|
| 010 | 600081739 | RENOLIN B 15 HVI 20LAPLA | 1 | EA | 1.00 | 1EA | 21.610 | 21.61 |
| 020 | 600046880 | RENOLIT EP 2 400GACRT | 24 | EA | 24.00 | 1EA | 1.690 | 40.56 |
| 030 | 600046873 | RENOLIT EP 2 12.5KAMET | 1 | EA | 1.00 | 1EA | 31.826 | 31.83 |
| 040 | 600518479 | TITAN ATF 4000 20LAPLA | 2 | EA | 2.00 | 1EA | 44.819 | 89.64 |
| 050 | 600518547 | TITAN GEAR HYP SAE 90 20LAPLA | 2 | EA | 2.00 | 1EA | 34.859 | 69.72 |
| 060 | 600063483 | RENOLIN B 46 HVI 20LAPLA | 3 | EA | 3.00 | 1EA | 22.800 | 68.40 |

| | |
|---|---|
| Total Goods | 321.76 |
| Subtotal | 321.76 |
| Total VAT @ 20.00% | 64.35 |
| Total DUE | 386.11 GBP |

Delivery to:
Chevron North Sea Ltd   C/O Asco UK   Shed 9 York Street ABERDEEN   AB11 5DD   United Kingdom

Notes:

| Item | Product Code (other code) | Description and Container | Quantity Sold | Sale unit | Quantity | Price unit | Unit price | Line Total GBP |
|---|---|---|---|---|---|---|---|---|
| 010 | 600681739 | RENOLIN B 15 HVI<br>20LAPLA | 1 | EA | 1.00 | 1EA | 21.610 | 21.61 |
| 020 | 600046880 | RENOLIT EP 2<br>400GACRT | 24 | EA | 24.00 | 1EA | 1.690 | 40.56 |
| 030 | 600046873 | RENOLIT EP 2<br>12.5KAMET | 1 | EA | 1.00 | 1EA | 31.826 | 31.83 |
| 040 | 600518479 | TITAN ATF 4000<br>20LAPLA | 2 | EA | 2.00 | 1EA | 44.819 | 89.64 |
| 050 | 600518547 | TITAN GEAR HYP SAE 90<br>20LAPLA | 2 | EA | 2.00 | 1EA | 34.859 | 69.72 |
| 060 | 600663483 | RENOLIN B 46 HVI<br>20LAPLA | 3 | EA | 3.00 | 1EA | 22.800 | 68.40 |

| | |
|---|---|
| Total Goods | 321.76 |
| Subtotal | 321.76 |
| Total VAT @ 20.00% | 64.35 |
| Total DUE | 386.11 GBP |

FIG. 5

| Item | Product Code | Description and Container | Quantity Sold | Sale unit | Quantity | Price unit | Unit price | Line Total GBP |
|---|---|---|---|---|---|---|---|---|
| 010 | 600681739 | RENOLIN B 15 HVI | 1 | EA | 1.00 | 1EA | 21.610 | 21.61 |
| | | 2  20LAPLA | | | | | | |
| 020 | 600046880 | RENOLIT EP 2 | 24 | EA | 24.00 | 1EA | 1.690 | 40.56 |
| | | 2  400GACRT | | | | | | |
| 030 | 600046873 | RENOLIT EP 2 | 1 | EA | 1.00 | 1EA | 31.826 | 31.83 |
| | | 2  12.5KAMET | | | | | | |
| 040 | 600518479 | TITAN ATF 4000 | 2 | EA | 2.00 | 1EA | 44.819 | 89.64 |
| | | 2  20LAPLA | | | | | | |
| 050 | 600518547 | TITAN GEAR HYP SAE 90 | 2 | EA | 2.00 | 1EA | 34.859 | 69.72 |
| | | 2  20LAPLA | | | | | | |
| 060 | 600663483 | RENOLIN B 46 HVI | 3 | EA | 3.00 | 1EA | 22.800 | 68.40 |
| | | 2  20LAPLA | | | | | | |

Total Goods 321.76
Subtotal 321.76
Total VAT @ 20.00% 64.35
Total DUE 386.11

FIG. 6

Variable Rate Personal Loan Transactions -Account number

| | Date | Transaction description | Debits | Credits | Balance |
|---|---|---|---|---|---|
| | Date | Interest rate as of 24/09/12- 13.900% per annum | | | Amount |
| [1] | 24 Sep | Opening balance | | | $45,000.00 DR |
| [2] | 26 Sep | Repayment/Payment | | 450.00 | $44,550.00 DR |
| [3] | 10 Oct | Repayment/Payment | | 450.00 | $44,100.00 DR |
| [4] | 12 Oct | Change in interest rate on 12/10/12 to 13.650% per annum | | | |
| [5] | 22 Oct | Interest charged | 538.85 | | $44,638.85 DR |
| [6] | 22 Oct | Fee for servicing your loan | 10.00 | | $44,648.85 DR |
| [7] | 24 Oct | Repayment/Payment | | 450.00 | $44,198.85 DR |
| [8] | 07 Nov | Repayment/Payment | | 450.00 | $43,748.85 DR |
| [9] | 21 Nov | Repayment/Payment | | 450.00 | $43,298.85 DR |
| [10] | 22 Nov | Interest charged | 510.05 | | $43,808.90 DR |
| [11] | 22 Nov | Fee for servicing your loan | 10.00 | | $43,818.90 DR |
| [12] | 05 Dec | Repayment/Payment | | 450.00 | $43,368.90 DR |
| [13] | 14 Dec | Change in interest rate on 14/12/12 to 13.400% per annum | | | |
| [14] | 19 Dec | Repayment/Payment | | 450.00 | $42,918.90 DR |
| [15] | 22 Dec | Interest charged | 485.88 | | $43,404.78 DR |
| [16] | 22 Dec | Fee for servicing your loan | 10.00 | | $43,414.78 DR |
| [17] | 31 Dec | Closing balance | | | $43,414.78 DR |

FIG. 7

Borrowers

Variable Rate Personal Loan Transactions - Account number 800

| | Date | Transaction description | Debits | Credits | Balance |
|---|---|---|---|---|---|
| | Date | Interest rate as of 20/09/12 - 13.900% per annum | | | Amount |
| [1] | 20 Sep | Opening balance | | | $0.00 |
| [2] | 20 Sep | Money we lent you | 45,000.00 | | $45,000.00 DR |
| [3] | 21 Sep | We confirm the following changes to your repayment arrangements: Your elected Direct Debit Repayment Amount: $450.00 per fortnight commencing 26/09/2012 | | | |
| [4] | 23 Sep | Closing balance | | | $45,000.00 DR |

EXTRACTING STRUCTURED INFORMATION FROM DOCUMENT IMAGES

REFERENCE TO RELATED APPLICATIONS

The present application claims the benefit of priority under 35 U.S.C. § 119 to Russian Patent Application No. 2021138551 filed Dec. 23, 2021, the disclosure of which is incorporated by reference herein.

TECHNICAL FIELD

The implementations of the disclosure relate generally to computer systems and, more specifically, to systems and methods for extracting structured information extraction from document images.

BACKGROUND

Conventional approaches to information extraction may exhibit high computational complexity, dependence on training data availability and various other deficiencies. Information extraction efficiency and quality may be further hindered by various physical structures of the documents being processed.

SUMMARY OF THE DISCLOSURE

In accordance with one or more aspects of the present disclosure, an example method of extracting information from a document image includes: receiving the document image; detecting a tabular structure within the document image; identifying a plurality of rows of the tabular structure, wherein each row of the plurality of rows comprises one or more lines; for each row of the plurality of rows, identifying a set of field types of one or more fields comprised by each line of the one or more lines comprised by the respective row; detecting, in each line of the one or more lines, a set of fields corresponding to a respective set of field types; and extracting information from the set of fields.

In accordance with one or more aspects of the present disclosure, an example system for comprises a memory and a processor coupled to the memory, the processor configured to: receive the document image; detect a tabular structure within the document image; identify a plurality of rows of the tabular structure, wherein each row of the plurality of rows comprises one or more lines; for each row of the plurality of rows, identify a set of field types of one or more fields comprised by each line of the one or more lines comprised by the respective row; detect, in each line of the one or more lines, a set of fields. corresponding to a respective set of field types; and extract information from the set of fields.

In accordance with one or more aspects of the present disclosure, an example computer-readable non-transitory storage medium comprises executable instructions that, when executed by a computer system, cause the computer system to: receive the document image; detect a tabular structure within the document image; identify a plurality of rows of the tabular structure, wherein each row of the plurality of rows comprises one or more lines; for each row of the plurality of rows, identify a set of field types of one or more fields comprised by each line of the one or more lines comprised by the respective row; detect, in each line of the one or more lines, a set of fields.

BRIEF DESCRIPTION OF THE DRAWINGS

The disclosure will be understood more fully from the detailed description given below and from the accompanying drawings of various implementations of the disclosure. The drawings, however, should not be taken to limit the disclosure to the specific implementations, but are for explanation and understanding only.

DETAILED DESCRIPTION

Described herein are systems and methods extracting structured information from document images. "Document" herein refers to any indicia-bearing medium, an image of which is available to a computing system that performs various information extraction tasks. An original document may be printed, typed, or handwritten (for example, by filling out a standard form). The document image may be a scanned image, a photographed image, or any other representation of a document that is being capable of being converted into a digital form accessible by the computing system. For example, "electronic document" may refer to a file comprising one or more digital content items that may be visually rendered to provide visual representations of the electronic document (e.g., on a display or a printed material). In various implementations, a document may conform to any suitable electronic file format, such as PDF, DOC, ODT, JPEG, etc.

A document may contain "structured information," which refers to information that is represented by tables and other regular layouts ("tabular structures"). Such structures may include repeated elements, such as rows and/or columns containing textual information. In an illustrative example, an invoice may include a table representing an itemized list of goods.

Typically, a tabular structure may include a plurality of cells, such that each cell is defined by an intersection of a corresponding row and column. In some implementations, at least some cells, rows, or columns may include embedded tables. For example, at least some of the rows of the tabular structure may include multiple lines of text.

Information extraction from documents that contain tabular structures may be hindered by existence, for a given document type, of multiple documents that differ by the nomenclature and structure of the fields, their relative positions, headings, etc. For example, each supplier of goods or services may have its own customized forms of invoices, each carrier may have its own customized forms of bills of lading, etc.

Furthermore, tabular structures may not necessarily contain the visual dividers and/or other formatting elements that are usually associated with common visual representations of various tables. Besides, a document may include additional text portions that are located outside of a tabular structure: for example, a restaurant menu may include, in addition to a tabular structure representing a list of dishes with their names and prices, various other information appearing outside of the tabular structure (e.g., descriptions of available discounts, plats du jour, allergy warnings, etc.).

Moreover, various documents may contain multi-page tables divided by various visual elements. Accordingly, various general purpose information extractors that have been trained on generic training data sets may not be capable of detecting and/or processing regular data structures with satisfactory quality, as extracting information from documents that contain tabular structures may require a priori knowledge of field types and relative positions in the tabular structure, and/or knowledge of validation rules which would allow validating the extracted information (e.g., by matching the sum of itemized amounts corresponding to individual line items to the total amount of an invoice being processed).

Thus, trainable classifiers that are focused on identifying tabular structures within document images and extracting information from such structures may be highly dependent on availability of training datasets including large sets of specific documents, e.g., invoices, business cards, identification documents, credit applications, etc., which may contain confidential information. Furthermore, each document within a training datasets should be accurately labeled, which is usually a manual operation. Accordingly, training such classifiers may require significant time and labor.

Aspects of the disclosure address the above noted and other deficiencies by providing efficient systems and methods for training neural network-based classifiers for extracting structured information from document images. Each neural network may include multiple neurons that are associated with learnable weights and biases. The neurons may be arranged in multiple layers. A neural network may be trained on a training dataset of labeled document images, such that each document is accompanied by a set of metadata ("labels") indicating, e.g., positions of tabular structures, visual separators (such as vertical or horizontal boundaries), field positions and types, etc. The neural network may generate an observed output for each training input. The observed output of the neural network may be compared with the corresponding known output corresponding to the training input as specified by the training data set, and the error may be propagated back to the previous layers of the neural network, whose parameters (e.g., the weights and biases of the neurons) may be adjusted accordingly in order to optimize the prediction accuracy.

In various implementations of the present disclosure, the training process may require very small training datasets, including those containing only a single sample (e.g., a labeled document image). Accordingly, information extraction systems operating in accordance with aspects of the present disclosure may be implemented by an off-the-shelf software product, and the custom training of such systems may be efficiently performed by an end user utilizing very small training datasets. Furthermore, the trainable classifiers operating in accordance with aspects of the present disclosure utilize wide variety of classification features that include visual words, visual reference elements, image features produced by convolution neural networks, etc.

Once trained, the classifiers may be used for information extraction from structures documents, thus improving both classification accuracy and the computational complexity as compared with various common systems and methods. The training and information extraction workflows are described herein with references to FIGS. 1A and 1B.

As noted herein above, the classifiers operating in accordance with aspects of the present disclosure may be employed to extract, from document images, information that is represented by tables and other regular layouts ("tabular structures"). Such structures may include repeated elements, such as rows and/or columns containing textual and/or non-textual visual information.

By virtue of being a special case of tabular structures, a table may include multiple cells that are organized into a rectangular grid by visible and/or invisible vertical and horizontal separators. In various illustrative example, a table (e.g., an invoice, a timetable, etc.) may be utilized for representing a list of information items, such that each item may be further subdivided into multiple elements. Each information item may be represented by a table row containing one or more lines, such that at least some lines contain one or more fields or partial fields (if a given field is a multi-line field), while other lines may contain no fields having extractable information.

In an illustrative example, the relative positions of the fields in a given row may be same or similar to relative positions of corresponding fields in other rows. Alternatively, certain variations in field positions between rows may be observed in some documents.

Thus, each row may be considered as representing a fillable form including a set of textual and/or non-textual fields. Examples of non-textual fields include images (e.g., thumbnails), non-alphanumeric symbols (such as checkmarks contained by checkboxes), etc.

Figure 2:
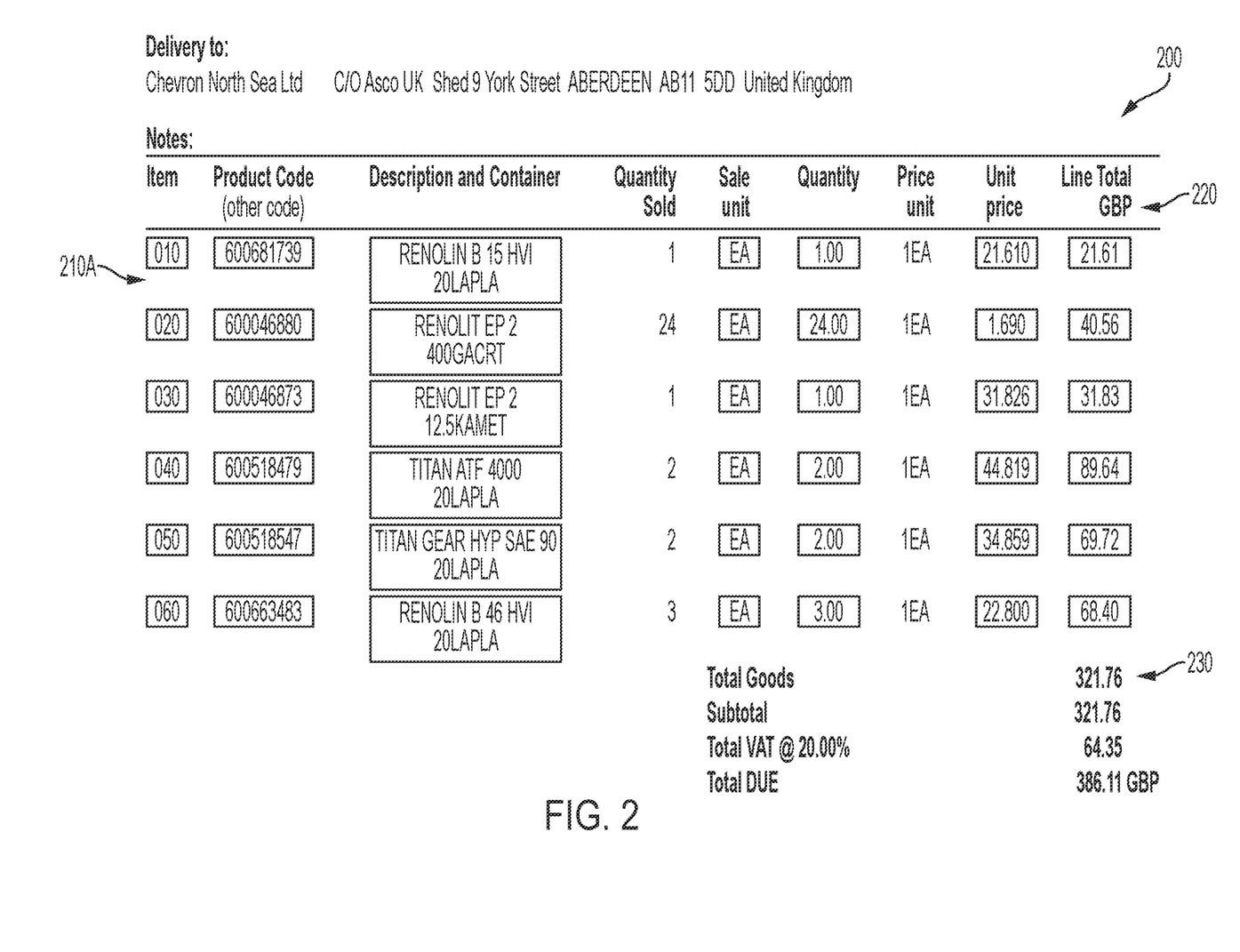
FIG. 2 illustrates an example table.

FIG. 2 illustrates an example of a table that can be processed by trainable classifiers operating in accordance with aspects of the present disclosure. As schematically illustrated by FIG. 2, the fields of the table 200, which represents an invoice containing an itemized list of goods with respective quantities, prices, etc., are labeled by metadata tags. In some implementations, a document image, which has been pre-processed by an optical character recognition (OCR) engine, may be rendered via a graphical user interface (GUI) thus allowing a user to identify, select, and visually mark the fields containing extractable information. Every identified field may be visually highlighted (e.g., by a rectangular frame, a different background color, and/or other visual means), and the user may be prompted to specify a tag identifying the semantic type of the field (e.g., Item, Product Code, Unit, etc.).

In FIG. 2, each row 210A-210N contains the fields associated with the specified goods, such that quantity, price, etc. The table 200 also includes the header 220 and the footer 230.

As noted herein above, neural networks that implement various information extraction functions may be trained on a training dataset of labeled document images, such that each document is accompanied by a set of metadata ("labels") indicating, e.g., positions of tabular structures, visual separators (such as vertical or horizontal boundaries), field positions and types, etc. In some implementations, information extraction systems operating in accordance with aspects of the present disclosure may implement a graphical user interface that facilitates field labeling in example documents that may be utilized for training the neural networks for information extraction.

Figure 3:
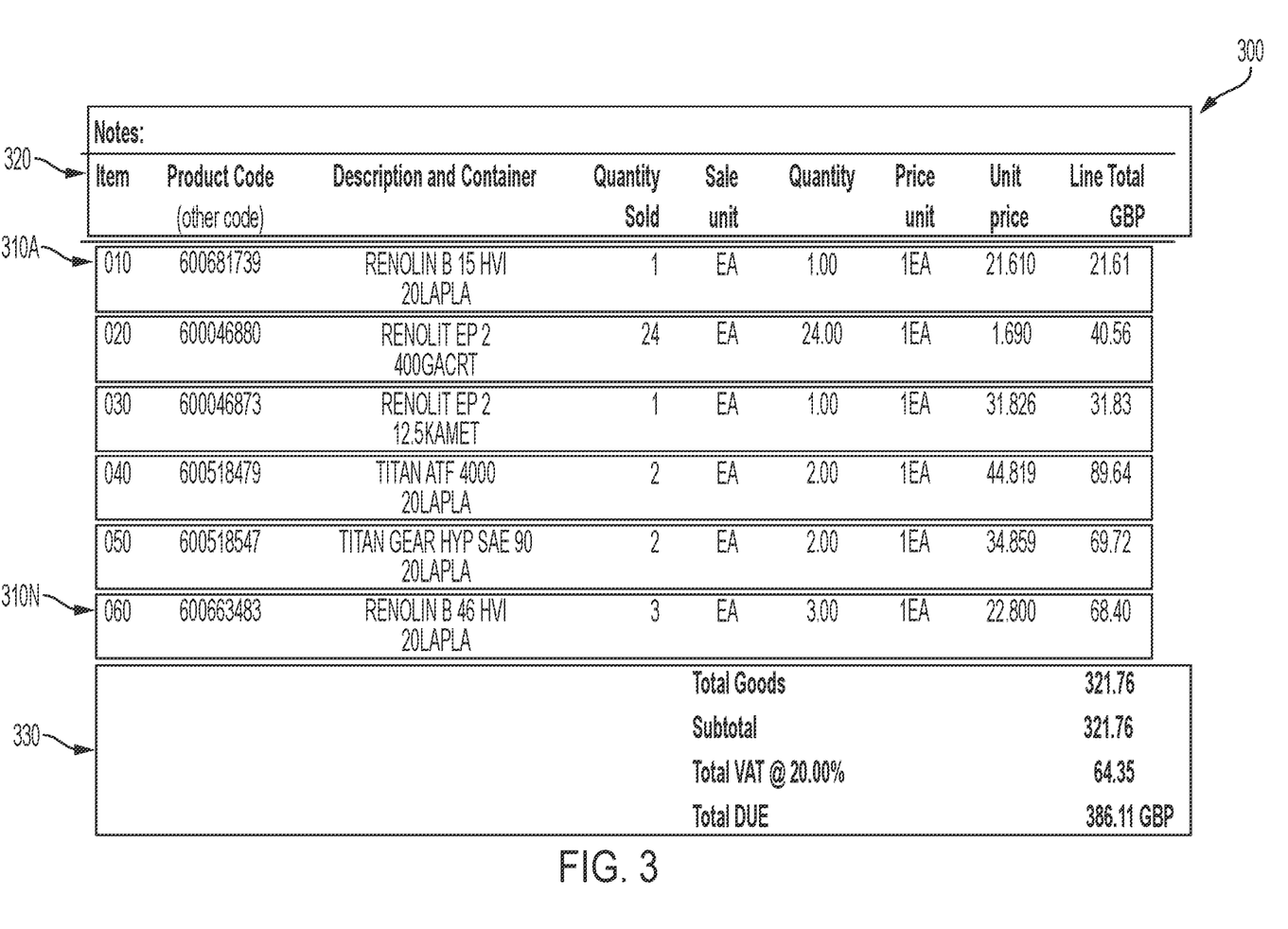
FIG. 3 schematically illustrates an example tabular structure, which is graphically split into rows representing respective information items.

FIG. 3 schematically illustrates an example tabular structure, which is graphically split into rows, such that each row represents a corresponding information item (an item of goods in the example of FIG. 3). As schematically illustrated by FIG. 3, the example tabular structure 300 contains a set of rows 310A-310N, such that each row 310 represents an information item (item of goods in the illustrative example of FIG. 3). Each row 310 includes a set of fields containing text reflecting various attributes of the item represented by the row. In addition to the multiple rows, the example tabular structure 300 contains the header 320. The example tabular structure 300 further contains the footer 330 containing multiple lines of text.

As noted herein above, the neural network training process may involve processing the data items of the training data set (e.g., labeled document images) by a neural network, which would generate an observed output for each training input. The observed output of the neural network may then be compared with the corresponding known output corresponding to the training input as specified by the metadata (e.g., labels) of the training data set, and the error may be propagated back to the previous layers of the neural network, whose parameters (e.g., the weights and biases of the neurons) may be adjusted accordingly in order to optimize the prediction accuracy.

Figure 4:
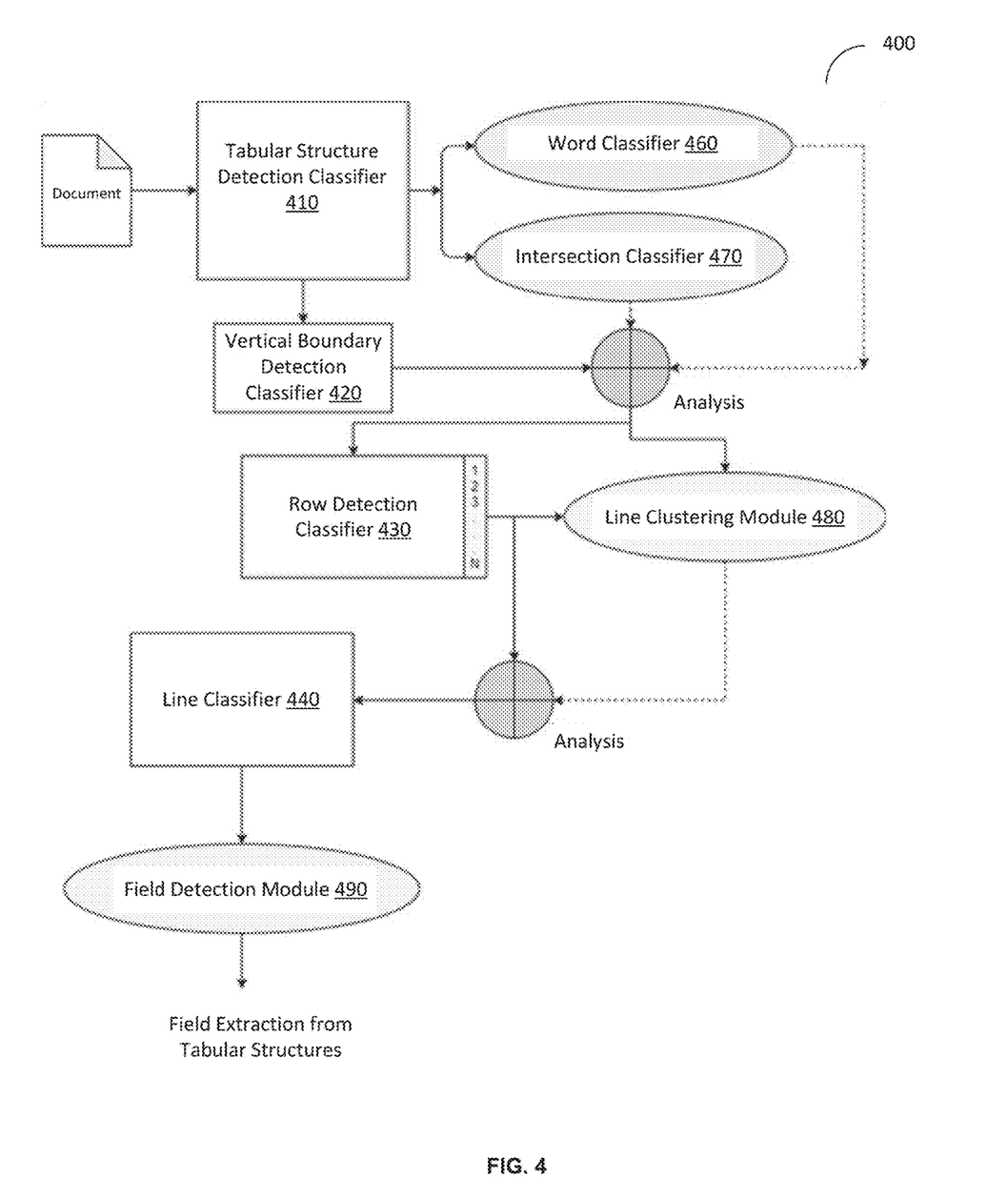
FIG. 4 schematically illustrates a high-level functional component diagram of an information extraction system operating in accordance with aspects of the present disclosure.

FIG. 4 schematically illustrates a high-level functional component diagram of an information extraction system operating in accordance with aspects of the present disclosure. As shown in FIG. 4, the system 400 may include several trainable classifiers 410-440. In the example of FIG. 4, the table detection classifier 410 identifies a tabular structure in a document. The vertical boundary detection classifier 420 identifies vertical boundaries of the tabular structure. The row detection classifier 430 identifies rows (corresponding to items) of the tabular structure. The line classifier 440 classifies the lines for extracting information from the fields within the identified rows.

In some implementations, the system may further include the word classifier 460 which determines whether a given word is a part of the tabular structure. The system may further include the intersection classifier 470 which identifies potential line and column intersections, as well as formulates hypotheses of existence of certain relationships between several words found within each cell of the tabular structure. The system may further include the line clustering module 480 which clusters the lines of the tabular structure. The system may further include the field detection module 490 which identifies positions of fields within the tabular structure.

In some implementations, each of the classifiers and functional modules 410-490 may be implemented by one or more neural networks, which may be trained as described herein below with reference to FIG. 1A.

Figure 1A:
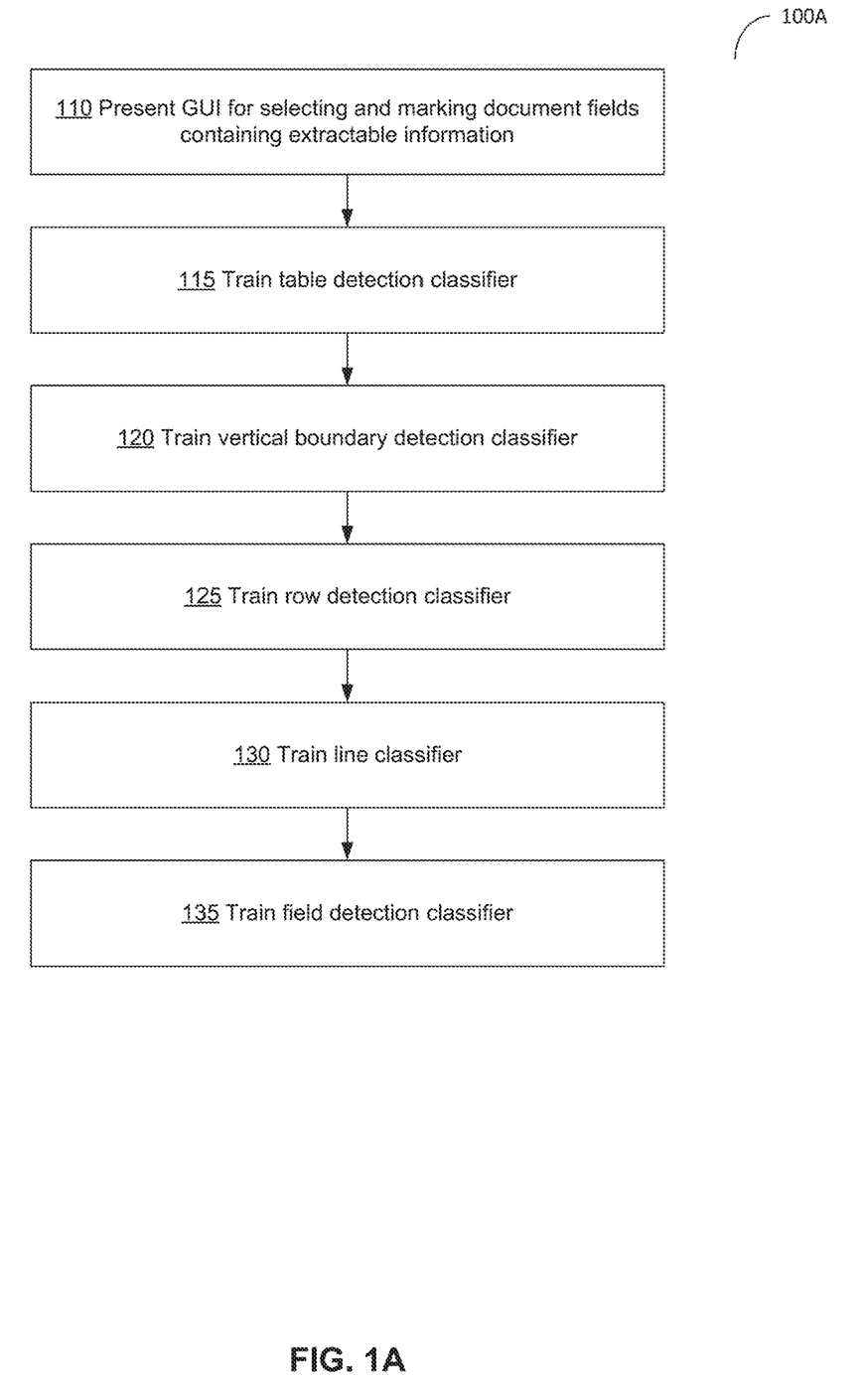
FIG. 1A is a flow diagram illustrating an example method of training the information extraction system operating in accordance with aspects of the present disclosure.

FIG. 1A is a flow diagram illustrating an example method 100A of training the information extraction system operating in accordance with aspects of the present disclosure. The method 100A may be performed by processing logic that may comprise hardware (e.g., circuitry, dedicated logic, programmable logic, microcode, etc.), software (such as instructions run on a processing device), firmware, or a combination thereof. In one implementation, the method 100A may be performed by one or more computer systems (e.g., computer system 900 of FIG. 9). In certain implementations, the method 100A may be performed by a single processing thread. Alternatively, the method 100A may be performed by two or more processing threads, each thread executing one or more individual functions, routines, sub-routines, or operations of the method. In an illustrative example, the processing threads implementing the method 100A may be synchronized (e.g., using semaphores, critical sections, and/or other thread synchronization mechanisms). Alternatively, the processing threads implementing the method 100A may be executed asynchronously with respect to each other. Therefore, while FIG. 1A and the associated description list the operations of the method 100A in certain order, various implementations of the methods may perform at least some of the described operations in parallel and/or in arbitrary selected orders.

At operation 105, the processing device implementing the method receives a training dataset that includes one or more document images. Each document image may be associated with a set of optical character recognition (OCR)-extracted text fragments with their corresponding positions within the image. Each document image may be also associated with a set of metadata items identifying various visual objects detected in the document, e.g., separators, encoded indicia such as barcodes, etc. For each object, the metadata specifies its type, coordinates within the image, and content (e.g., text). Thus, the information extraction system is capable of processing wide range of document types, including documents in various natural languages, printed or handwritten documents, etc.

For training the information extraction system, each document image of the training dataset may be associated with a set of labels indicating certain elements of one or more tabular structures found in the document image.

At operation 110, the set of training documents may be presented via a GUI prompting a user to identify, select, and visually mark the fields containing extractable information. In various implementations, the user may identify and mark only a subset of fields that are relevant for the subsequent processing. Every identified field may be visually highlighted (e.g., by a rectangular frame, a different background color, and/or other visual means), and the user may be prompted to specify a metadata tag identifying the semantic type of the field (e.g., Item, Product Code, Unit, etc.). In some implementations, the user may only be prompted to identify the relevant fields and associate them with corresponding metadata tags, while relieving the user from identifying other elements of the tabular structure, like boundaries, separators, columns, etc.

Training the classifiers of the information extraction system may involve performing the information extraction operations on the documents of the training data set. Each classifier (e.g., implemented by a neural network) may generate an observed output for each training input. The observed output of the neural network may be compared with the corresponding known output corresponding to the training input as specified by the training data set, and the error may be propagated back to the previous layers of the neural network, whose parameters (e.g., the weights and biases of the neurons) may be adjusted accordingly in order to optimize the prediction accuracy.

In some implementations, for improving efficiency of the training process, the training data set may be processed by a clustering module (e.g., implemented by a neural network) which groups the documents into several clusters based on their visual similarity. The similarity metric may reflect the similarity of images or image fragments containing tabular structures. The similarity-based grouping would presumably group together the documents of the same kind/type (e.g., invoices issued by the same entity). Each cluster would include a relatively small number (e.g., less than ten) of the labeled document images.

At operation 115, the processing device trains the table detection classifier (e.g., classifier 410 of FIG. 4) for detecting tabular structures within a document. Should more than one tabular structure be found in the document, the operations 120-135 may be performed for each identified tabular structure.

At operation 120, the processing device trains the vertical boundary detection classifier (e.g., classifier 420 of FIG. 4) for identifying vertical boundaries of the tabular structures found in the document. Vertical boundary herein shall refer to a space between an outer (leftmost or rightmost) column of the document and the nearest textual object. Detecting such boundaries would facilitate accurately detecting tables that are wrapped by other text (e.g., one or more textual objects may be located to the left and/or to the right of a table). If a tabular structure expands to the whole width of the document, the vertical boundaries of the tabular structure would match the vertical boundaries of the document.

In some implementations, detecting vertical boundaries may involve identifying high-frequency words (e.g., words having respective highest frequencies of occurrences among all words in the document or part of the document), which may include the words utilized by table headers, footers, and/or other structural elements of the document. Accordingly, positions of elements of a tabular structure (e.g., vertical boundaries) may be determined relative to the identified high-frequency words. Alternatively, visual separators, barcodes, and/or other elements may be used as "anchor" elements instead of high-frequency words for identifying relative positions of the elements of a tabular structure.

In some implementations, the vertical boundary detection classifier (e.g., classifier 420 of FIG. 4) may be trained to identify visual spaces between an outer (leftmost or rightmost) word of a tabular structure and the nearest neighboring word, and associate each identified visual space with a binary value reflecting the presence or absence of a vertical boundary at the identified visual space.

Next, word delimiting spaces are identified, and each space is either extended to the next line or stored for further processing. The identified word delimiting spaces are then assembled in each line and utilized for identifying the vertical boundaries. The identified vertical boundaries are then classified in order to generate heatmaps (histograms) with respect to frequency words, which specify the probability of finding a vertical boundary there.

Training the vertical boundary detection classifier may involve evaluating each identified visual space interval in terms of its similarity to the boundaries identified by the training metadata. The classification features that are fed to the classifier may be represented by a vector of probabilities with respect to each frequency word.

In some implementations, in addition to the vertical boundary detection classifier 420 of FIG. 4, a word classifier (e.g., classifier 460 of FIG. 4), which determines whether a given word is a part of the tabular structure. Furthermore, additional classification features may be obtained from an intersection classifier (e.g., classifier 470 of FIG. 4), which identifies potential line and column dividers, as well as formulates hypotheses of existence of certain relationships between several words found within each cell of the tabular structure.

Classifiers 460 and/or 470 may be implemented by a recurrent neural network (RNN) that is trained to predict the next character in a sequence of characters, or is trained to separate the contents of tabular structures from headers. In some implementations, classifiers 460 and/or 470 may employ one or more Long-short term memory (LSTM) layers, which generate a vector (of a predefined size) representing a given sequence of characters.

In some implementations, the classifier 460 and/or 470 may process a vector of features representing a document image. The classification features may include the position of a given word within the document image and/or a set of symbols of the word. Such classification features may be determined by a pre-processing OCR stage for each word that includes at least one symbol.

The classifier may include two sub-networks. The first sub-network that generates a matrix representing a pseudo-image of the document. Feature vectors representing the words are then projected, by word positions, onto the matrix, thus producing a three-dimensional numeric matrix. The three-dimensional matrix is then fed to the second sub-network, which traverses the matrix by rows and columns and re-computes the values of the matrix elements. Once the network is trained, the reverse procedure is performed by the same subnetwork, thus reversing re-computations performed on the values of the matrix elements.

Thus, the second subnetwork produces a vector of features for each word found in the document, which include numeric values reflecting the word itself, the position of the word within the document (e.g., the position of the geometric center of the word), and/or effect of other words and their positions. Thus, the matrix representing the pseudo-image of the document may be split into three portions: the horizontal portion, i.e., the horizontal output of the network, which is related to the hypothesis of lines; the vertical portion, i.e., the vertical set of parameters, which is related to the hypothesis of columns; and the degree of association of the word to the tabular structure.

As schematically illustrated by FIG. 4, the outputs of classifiers 460 and/or 470 may, in some implementations, be utilized as additional classification features for training the system, in addition to the output produced by the vertical boundary detection classifier (e.g., classifier 420 of FIG. 4). While classifiers 460 and 470 are optional, they may substantially improve the accuracy of the output produced by the system.

Referring again to FIG. 1A, at operation 125, the processing device trains the row detection classifier (e.g., classifier 430 of FIG. 4) for detecting the row layout of the tabular structure. The row detection classifier may traverse the rows of the tabular structure. For each row of the plurality of the row detecting classifier may process textual and/or image features in order to identify a set of field types of one or more fields comprised by each line of one or more lines comprised by the row.

Accordingly, the row detection classifier may be trained to classify, by processing textual and/or image features, rectangular image fragments corresponding to text lines into several classes, including the first line of a row, the last line of the row, an intermediate line of the row, and/or an external line associated with the row. In some implementations, a subset of the above-referenced classes may be utilized. Alternatively, additional classes may be introduced, e.g., for determining whether a given line is the first line of a nested table.

In some implementations, a separate classifier may be trained for every identified class of lines, such that the classifier would yield a likelihood of an input image fragment containing a particular line being associated with a respective class. Accordingly, each line of the tabular structure may be processed by all classifiers, and thus may be associated with an appropriate class, by identifying maximum likelihoods and/or applying threshold likelihood values.

In an illustrative example, two lines are being classified. For the first line, the classifier estimated the likelihood of the line being the first line of a row as 0.8 and the likelihood of the line being the last line of a row as 0.2 For the second line, the classifier estimated the likelihood of the line being the first line of a row as 0.9 and the likelihood of the line being the last line of a row as 0.4. By applying a set of predefined threshold and comparing the computed likelihoods, the system may determine that the second line is the first line of a separate row (rather than an intermediate or the last line of a preceding row). This example illustrates that the values produced by the classifiers for two neighboring lines may not always be sufficient for unambiguously classifying the two lines, and thus additional information (such as additional lines, predefined thresholds, etc.) may need to be taken into consideration.

Based on the classification, the horizontal boundaries of the tabular structures may also be determined (e.g., the top horizontal boundary positioned above the first identified row of the tabular structure and the bottom horizontal boundary positioned below the last row of the tabular structure).

For determining the classification features to be fed to the line classifiers, each line can be split into words (e.g., based on a predefined maximum intra-word space size), and patterns describing the word positions are generated. Then, for all lines of the presumed tabular structure a histogram is generated reflecting the distribution of positions and sizes of words and spaces). Accordingly, high histogram values would correspond to image areas containing larger numbers of words, while low histogram values would correspond to image areas containing smaller numbers of words. The histogram can then be filtered based on a predefined threshold, thus producing a set of parameters characterizing the words and spaces in the corresponding line. The set of parameters may include, e.g., the number of symbols within the analyzed line, the ratio of letters/digits, the left or right alignment, etc. Hence, each position of a line within a table row would be characterized by a corresponding set of parameters. The system may thus pre-compute several patterns associating line positions and line features.

Figure 5:
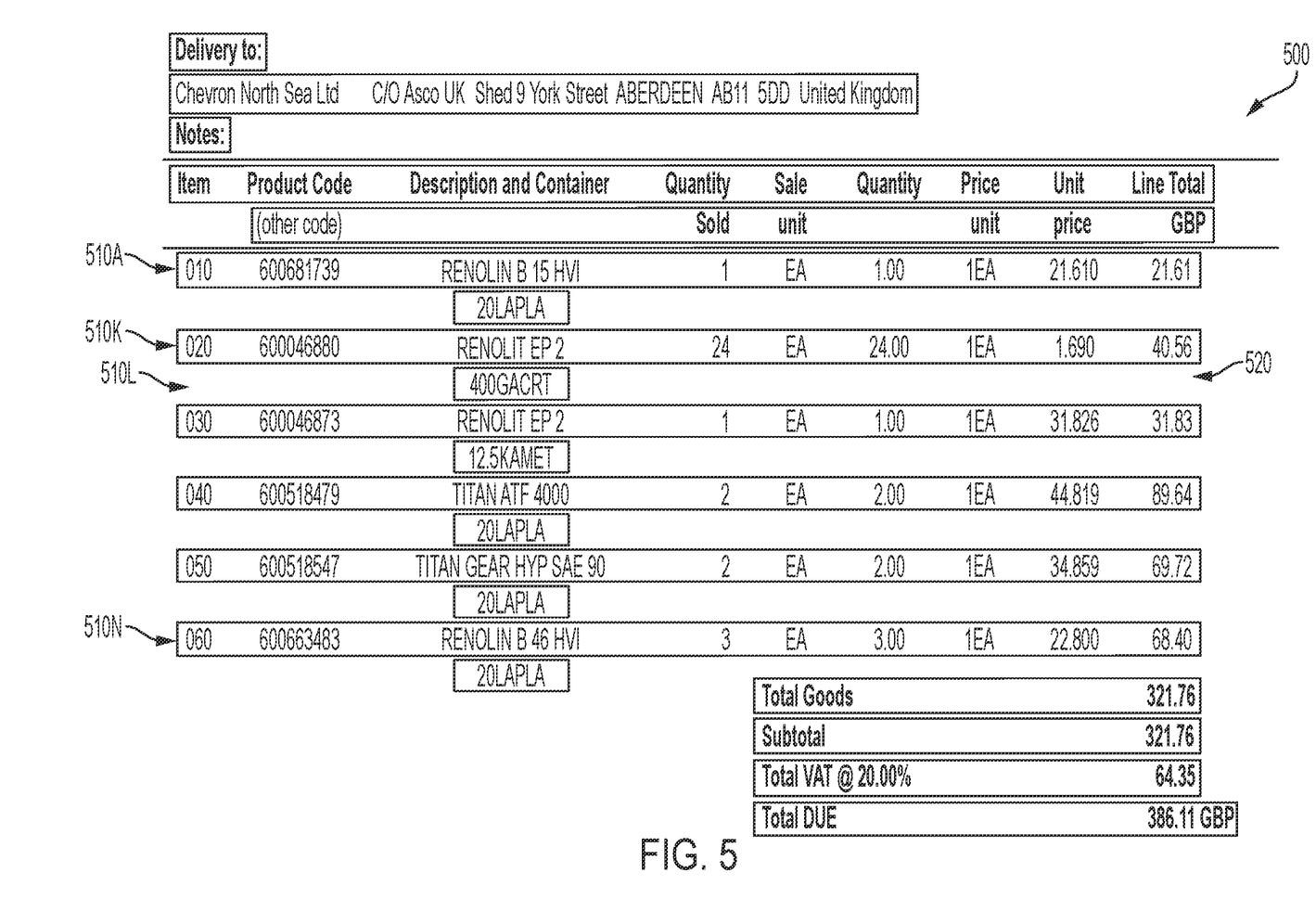
FIG. 5 schematically illustrates an example tabular structure which includes multiple lines.

FIG. 5 schematically illustrates an example tabular structure 500 which includes multiple lines 510A-510N. Each line 510 may include one or more words. Each row may include one or more lines, while each line may only be associated with a single row. The example row 520 includes two lines 510K (the first line of the row) and 510L (the last line of the row).

Referring again to FIG. 1A, at operation 130, the processing device trains the line classifier (e.g., classifier 440 of FIG. 4) for extracting information from the fields of the tabular structure.

Two or more lines may be associated with the same type if they are visually similar when looked at "against the light," i.e., if the intra-word and inter-word spaces in those lines match or differ by no more than a predefined threshold difference. If two or more lines of the same type contain labeled fields, the order and positions of fields should also match. Under such a definition, a simple table with rectangular elements would usually be composed of lines sharing the same type, while tables having multi-line rows would usually include several (e.g., two or three) types of lines. Denoting each line type with a corresponding alphabet symbol (e.g., A, B, C, etc.), the table structure may be described by a regular expression of the alphabet symbols.

In some implementations, the line classifier (e.g., classifier 440 of FIG. 4) may utilize the same classification features as those that are used by the row detection classifier (e.g., classifier 430 of FIG. 4). The line classifier 440 may classify the lines into several classes, such that each class is associated with a set of fields that are found in the corresponding lien. Accordingly, the classifier is utilized for identifying, in a given line, the types of fields for subsequent information extraction.

Figure 6:
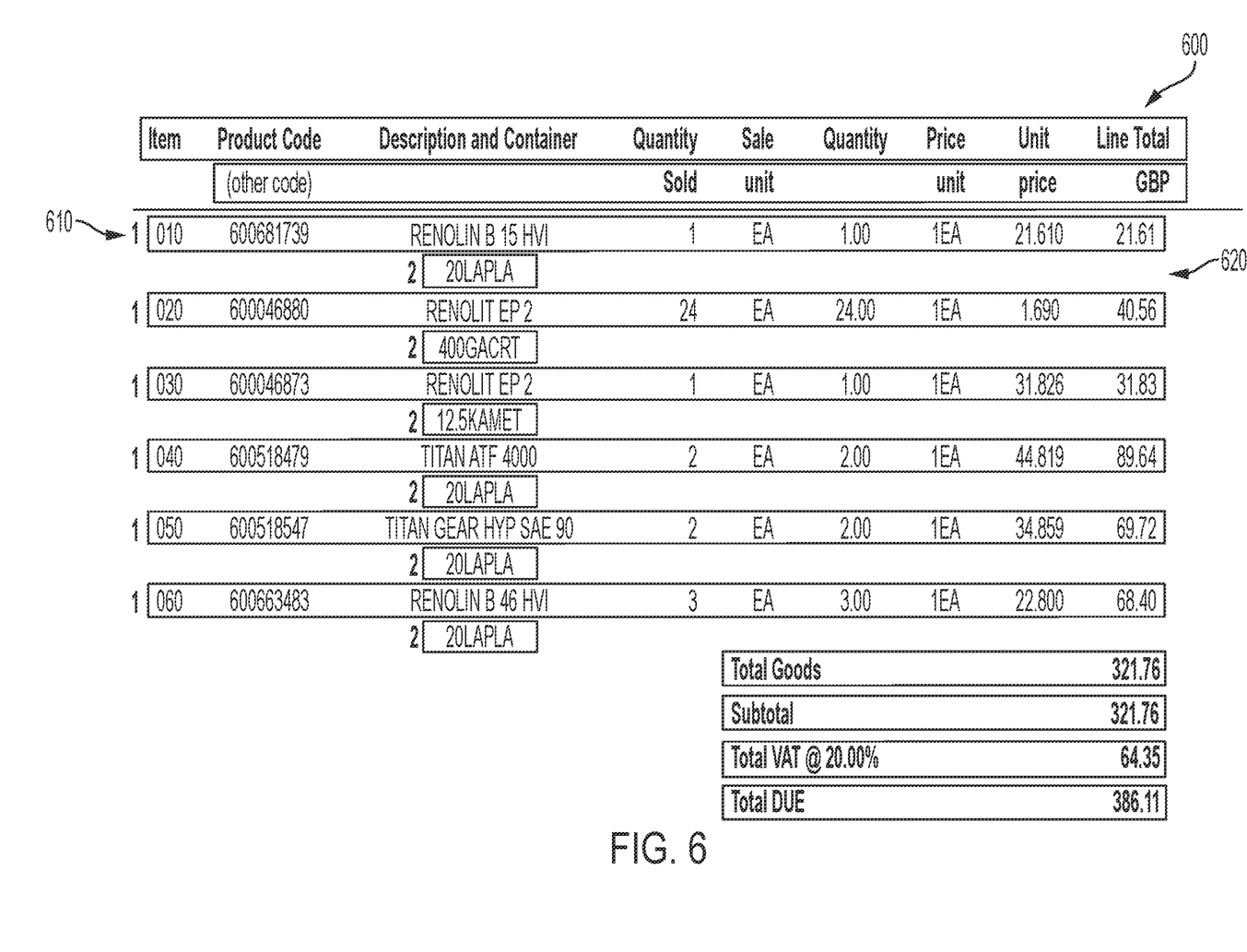
FIG. 6 schematically illustrates examples of different line types within a table.

FIG. 6 schematically illustrates examples of line types. As shown in FIG. 6, which schematically illustrates an example table 600, the line 610 is associated with the first line type and includes the following fields: Item, Product Code, Description and Container, Quantity Sold, Sale unit, Quantity, Price unit, Unit Price, and Total. The line 620 is associated with the second line type and only includes the fields Description and Container. Thus, the line type conveys the information on which field types the system should attempt to identify within the line, i.e., which components/field parts should be identified in case of multi-line fields.

Figure 7:
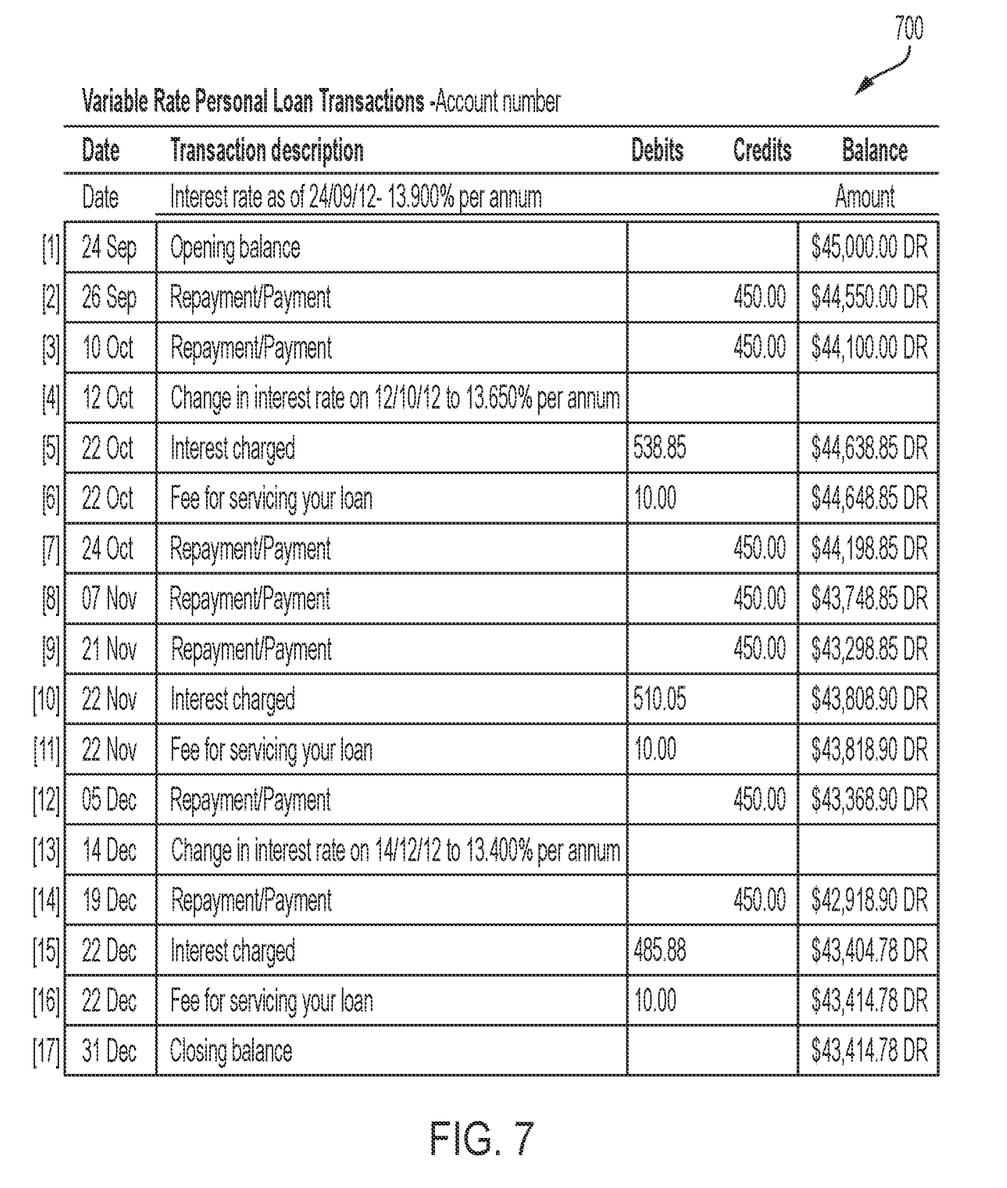
FIGS. 7-8 schematically illustrate example tables.

The results produced by line classifier 440 are greatly affected by the line labeling in the training dataset. FIG. 7 schematically illustrates an example table 700. If the fields Debits and Credits are not labeled in the training data set, all lines of the table 700 would be classified as belonging to a single type that includes the following fields: Data, Transaction Description, and Balance. Conversely, if the fields Debits and Credits are labeled in the training data set, the table 700 would include lines of three types: (1) lines without Debits and Credits fields, (2) lines including Debits field, and (3) lines including Credits field.

Figure 8:
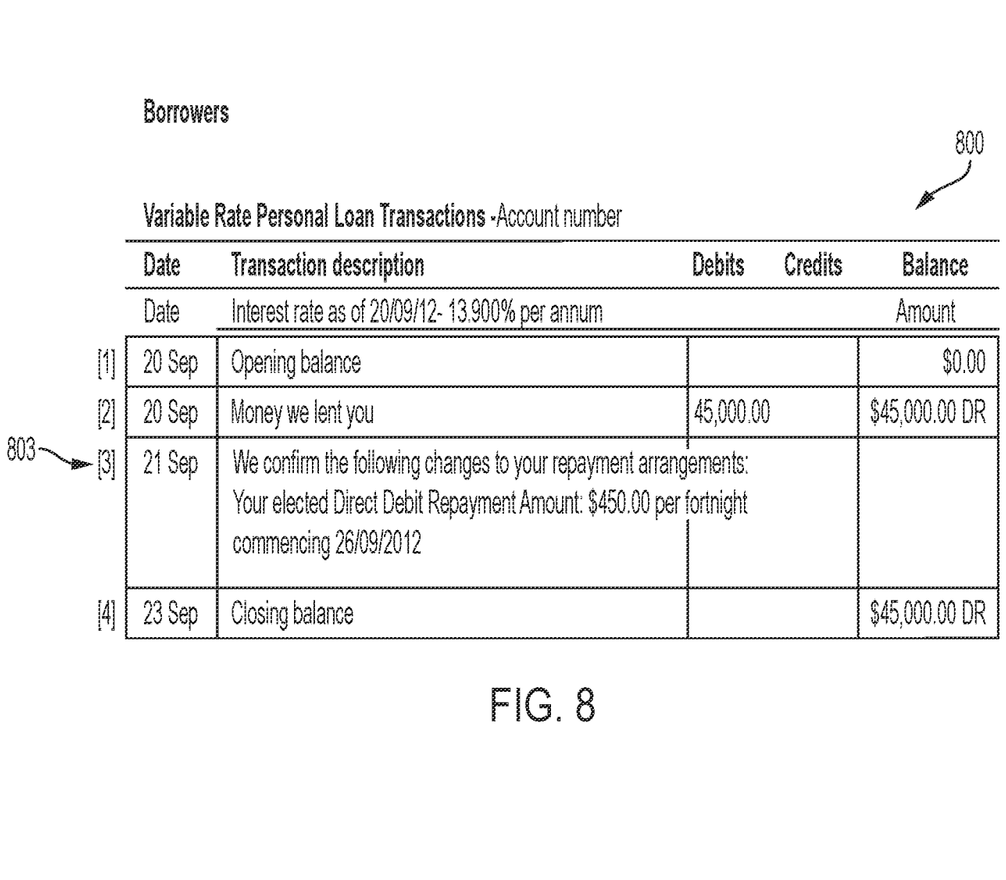

In general, different rows of a table may include different numbers of lines, and the fields may overlap vertically (e.g., in several lines of table 700, the Transaction Description transcends the boundary pf the Debits field). In the illustrative example of FIG. 8, which schematically illustrates the example table 800, the Transaction Description field in position 803 includes three lines, which transcend the presumed boundary of the Debits field. However, since the system is focused on identifying the fields rather than physical table structure, such deviations from presumed table structure would not affect the quality of information extractions.

Referring again to FIG. 1A, at operation 135, the processing device trains the field detection module (e.g., field detection module 490 of FIG. 4) for detecting fields of the tabular structure. In some implementations, the field detection process may include two stages: the first stage identifies a set of visual reference elements, while the second stage localizes the fields within a line of a known type.

The visual reference elements may include high-frequency words, visual objects, barcodes, separators, headings, annotations, visual words, etc. The visual reference elements may subsequently be utilized for detecting the fields within the document, e.g., based on the known field format and known offsets from one or more visual reference elements. Accordingly, the first stage identifies a set of visual reference elements which can be used for subsequent field detection.

As noted herein above, the second stage localizes the fields within a line of a known type. The training process involves associating each field of each line type with a corresponding data format and a set of geometric rules of detecting the field (e.g., offsets and directions from certain visual reference elements). The data format may specify the allowable alphabets (e.g., digits, letters, etc.), the number of symbols in the field, certain geometric parameters, etc.

In some implementations, in addition to the above-described heuristic approach, a trainable classifier may be utilized, which may yield a likelihood of a given word being associated with a certain field. Thus, the field detection module 490 identifies all fields and/or field portions within each line.

The trained classifiers may then be used for information extraction, as described in detail herein below with reference to FIG. 1B.

Figure 1B:
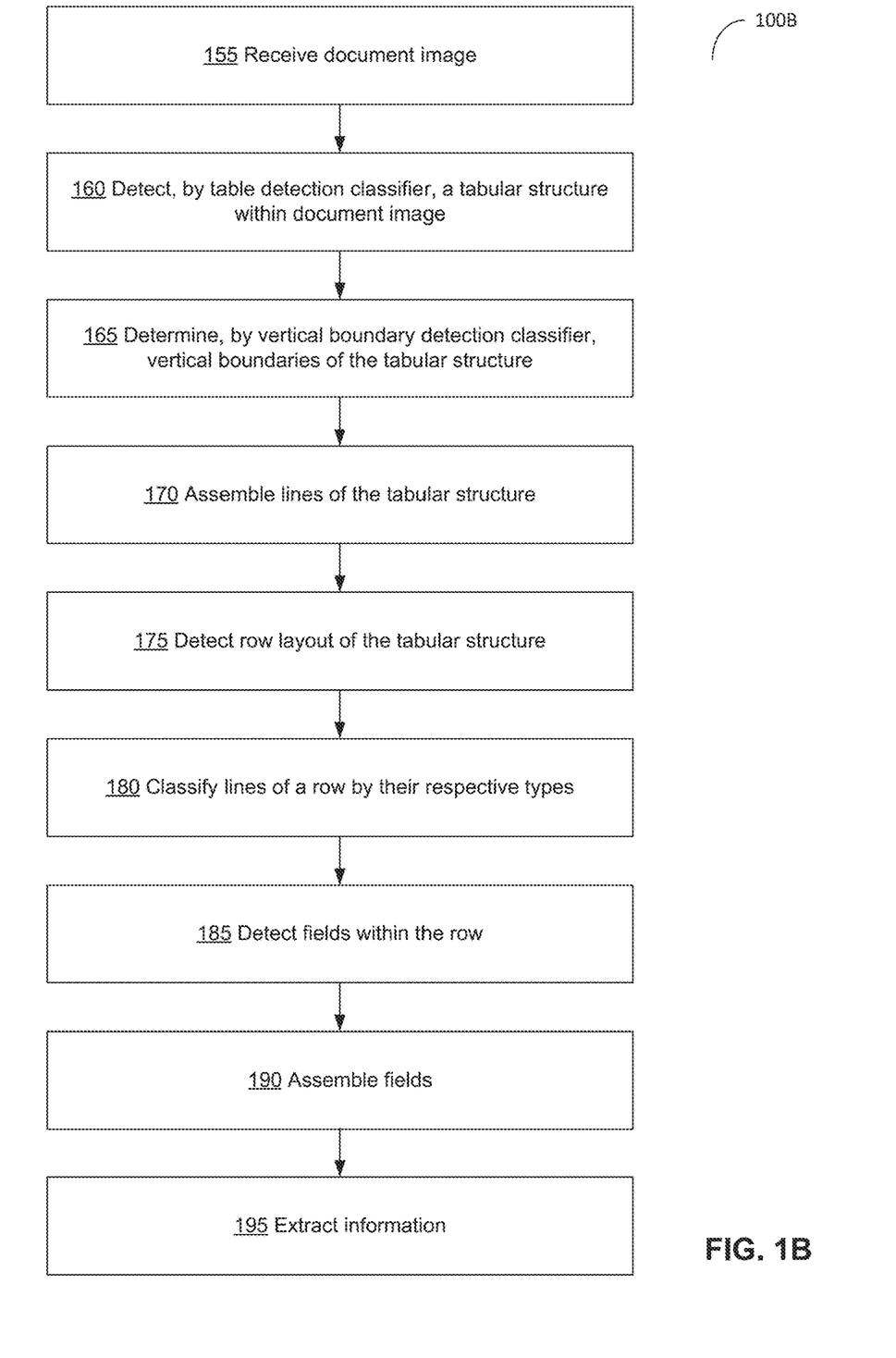
FIG. 1B is a flow diagram illustrating an example method of processing document images by an information extraction system operating in accordance with aspects of the present disclosure.

FIG. 1B is a flow diagram illustrating an example method of processing document images by an information extraction system operating in accordance with aspects of the present disclosure. The method 100B may be performed by processing logic that may comprise hardware (e.g., circuitry, dedicated logic, programmable logic, microcode, etc.), software (such as instructions run on a processing device), firmware, or a combination thereof. In one implementation, the method 100B may be performed by one or more computer systems (e.g., computer system 900 of FIG. 9). In certain implementations, the method 100B may be performed by a single processing thread. Alternatively, the method 100B may be performed by two or more processing threads, each thread executing one or more individual functions, routines, subroutines, or operations of the method. In an illustrative example, the processing threads implementing the method 100B may be synchronized (e.g., using semaphores, critical sections, and/or other thread synchronization mechanisms). Alternatively, the processing threads implementing the method 100B may be executed asynchronously with respect to each other. Therefore, while FIG. 1B and the associated description list the operations of the method 100B in certain order, various implementations of the methods may perform at least some of the described operations in parallel and/or in arbitrary selected orders.

At operation 155, the processing device implementing the method receives a document image. The document image may be associated with a set of optical character recognition (OCR)-extracted text fragments with their corresponding positions within the image. For multi-page documents, the operations 165-195 may be performed for every page of the document.

At operation 160, the processing device utilizes a pre-trained table detection classifier (e.g., classifier 410 of FIG. 4) for detecting a tabular structure within a document. The classification may be performed based on the image features and/or text extracted from the document. The table detection classifier receives an image of the document and yields a value reflecting the presence or absence of a tabular structure within the image. Such classification is especially useful for processing multi-page documents, in which some of the pages may contain no tabular structures, and such pages may not be further processed by operations 165-195. Should more than one tabular structure be detected within the document, the information extraction operations 165-195 may be performed for each identified tabular structure.

At operation 165, the processing device utilizes the vertical boundary detection classifier (e.g., classifier 420 of FIG. 4) for identifying vertical (i.e., left and right) boundaries of the tabular structure. As noted herein above, the vertical boundary detection classifier (e.g., classifier 420 of FIG. 4) may associate, which each visual space found in the document image, a binary value reflecting the presence or absence of a vertical boundary at the identified visual space.

At operation 170, the processing device assembles the lines of the tabular structure, e.g., by grouping the detected words and spaces between them.

At operation 175, the processing device utilizes the row detection classifier (e.g., classifier 430 of FIG. 4) for detecting the row layout of the tabular structure. The row detection classifier may traverse the rows of the tabular structure. For each row of the plurality of the row detecting classifier may process textual and/or image features in order to identify a set of field types of one or more fields comprised by each line of one or more lines comprised by the row.

In some implementations, the classification may be performed by a set of classifiers, each of which produced the likelihood of a given line being associated with a corresponding class (e.g., the first line of a row, the last line of the row, the intermediate line of the row, an external line associate with the row, or a first line of a nested table). The results produced by the classifier may be represented by a linear division graph, the edges of which may be weighted by the computed likelihoods. The classifiers may utilize the pre-computed patterns associating line features and the line position within a row. If a match is found, the line classification may be accepted as being accurate, otherwise, further classification may be performed (e.g., using different patterns from other training datasets, etc.).

In some implementations, several competing classifications of the lines may be produced, in which case the best classification may be chosen by applying one or more pre-defined classification quality criteria.

Based on the line classifications, horizontal boundaries between the table rows may be identified. In some implementations, the horizontal boundaries may be identified by clustering the table lines, e.g., using the clustering module 480 of FIG. 4. For each line, the clustering features may be determined, e.g., the word positions and sizes, the inter-word space positions and sizes, etc. Then, clustering may be attempted into different predefined numbers of clusters, thus producing several competing hypotheses. Each hypothesis may be associated with a corresponding confidence score, based on which the best clustering may be chosen.

In some implementations, the row layout may be determined by comparing the results produced by the line classifiers and line clustering module and choosing the option associate with the maximum confidence score. In other words, the document is processed by a set of line classifiers which may identify the first and the last lines of each row. The classification may be verified by clustering the lines based on the above-described clustering features. Should the results of classifiers and clustering be different, the best result may be chosen (e.g., based on respective confidence scores). Alternatively, the subsequent processing may be performed for several competing row layouts, and the best option may be chosen at a later stage of the information extraction.

In other implementations, other means of determining the row layout (e.g., by estimating the quality of combining lines and/or fields) may be utilized by the information extraction systems operating in accordance with aspects of the present disclosure.

At operation 180, the processing device classifies the lines by their respective types. In some implementations, the line classifier (e.g., classifier 440 of FIG. 4) may utilize the same classification features as those that are used by the row detection classifier (e.g., classifier 430 of FIG. 4). The line classifier 440 may classify the lines into several classes, such that each class is associated with a set of fields that are found in the corresponding line. Accordingly, the classifier is utilized for identifying, in a given line, the types of fields for subsequent information extraction.

At operation 185, the processing device utilizes the field detection classifier (e.g., classifier 480 of FIG. 4) for detecting fields within each row of the tabular structure based on the respective field types.

At operation 190, the processing device assembles the fields from single-line filed portion and extracts, at operation 195, the information from the identified fields. The extracted information may be stored in one or more data structure and utilized by various applications for performing their respective tasks. In an illustrative example, the document may represent an invoice that includes a table representing an itemized list of goods. Accordingly, the processing device may apply the set detected fields to the document image to identify, for each field, a corresponding image fragment. The processing device may then perform information extraction from the text recognized within the image fragment corresponding to the field and assign the resulting textual and/or numeric value to the field for further processing (e.g., for feeding into a system for account payable processing).

Figure 9:
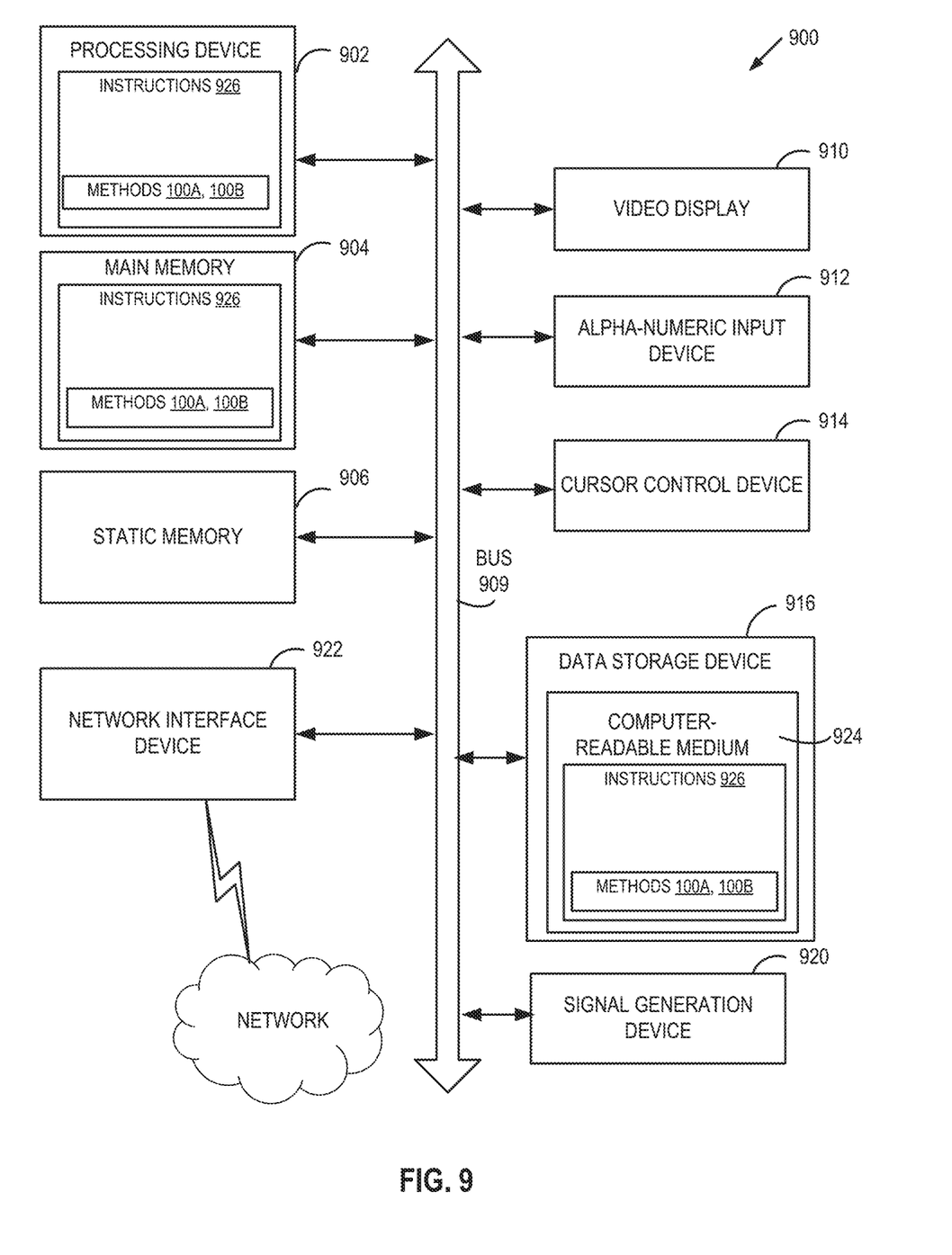
FIG. 9 illustrates a block diagram of a computer system in accordance with some implementations of the present disclosure.

FIG. 9 depicts an example computer system 900 which may perform any one or more of the methods described herein. The computer system may be connected (e.g., networked) to other computer systems in a LAN, an intranet, an extranet, or the Internet. The computer system may operate in the capacity of a server in a client-server network environment. The computer system may be a personal computer (PC), a tablet computer, a set-top box (STB), a Personal Digital Assistant (PDA), a mobile phone, a camera, a video camera, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 900 includes a processing device 902, a main memory 904 (e.g., read-only memory (ROM), flash memory, dynamic random access memory (DRAM) such as synchronous DRAM (SDRAM)), a static memory 906 (e.g., flash memory, static random access memory (SRAM)), and a data storage device 916, which communicate with each other via a bus 909.

Processing device 902 represents one or more general-purpose processing devices such as a microprocessor, central processing unit, or the like. More particularly, the processing device 902 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 902 may also be one or more special-purpose processing devices such as an application specific integrated circuit (ASIC), a field programmable gate array (FPGA), a digital signal processor (DSP), network processor, or the like. The processing device 902 is configured to execute instructions 926 for implementing the methods 100A, 100B of extracting structured information from document images.

The computer system 900 may further include a network interface device 922. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 920 (e.g., a speaker). In one illustrative example, the video display unit 910, the alphanumeric input device 912, and the cursor control device 914 may be combined into a single component or device (e.g., an LCD touch screen).

The data storage device 916 may include a computer-readable medium 924 on which is stored the instructions 926 embodying any one or more of the methodologies or functions described herein. The instructions 926 may also reside, completely or at least partially, within the main memory 904 and/or within the processing device 902 during execution thereof by the computer system 900, the main memory 904 and the processing device 902 also constituting computer-readable media. In some implementations, the instructions 926 may further be transmitted or received over a network via the network interface device 922.

While the computer-readable storage medium 924 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the aspects of the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "selecting," "storing," "analyzing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description. In addition, aspects of the present disclosure are not described with reference to any particular programming language. It will be appreciated that a variety of programming languages may be used to implement the teachings of the present disclosure as described herein.

Aspects of the present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read-only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Furthermore, the terms "first," "second," "third," "fourth," etc. as used herein are meant as labels to distinguish among different elements and may not necessarily have an ordinal meaning according to their numerical designation.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite only those features regarded as the disclosure.

The invention claimed is:

1. A method, comprising:
   receiving, by a processing device, a document image;
   detecting a tabular structure within the document image;
   identifying a plurality of rows of the tabular structure, wherein each row of the plurality of rows comprises plurality of lines;
   for each row of the plurality of rows, identifying a respective plurality of lines comprised by the row;
   detecting, in each line of the plurality of lines, a set of fields corresponding to a respective set of field types; and
   extracting information from the set of fields.

2. The method of claim 1, wherein the tabular structure is provided by a table.

3. The method of claim 1, further comprising:
   identifying vertical boundaries of the tabular structure.

4. The method of claim 1, wherein identifying the plurality of rows further comprises:
   identifying a plurality of lines of the tabular structure; and
   classifying each line of the plurality of lines.

5. The method of claim 1, wherein identifying the plurality of rows further comprises:
   identifying a plurality of lines of the tabular structure; and
   clustering the plurality of lines into a plurality of clusters.

6. The method of claim 1, wherein identifying the set of field types further comprises:
   determining, for each line of the one or more lines, a corresponding line type derived from a corresponding set of field types of the one or more fields comprised by the line.

7. The method of claim 1, further comprising:
   detecting a multi-line field by grouping two or more single-line field portions.

8. A system comprising:
   a memory; and
   a processing device operatively coupled to the memory, the processing device configured to:
   receive a document image;
   detect a tabular structure within the document image;
   identify a plurality of rows of the tabular structure, wherein each row of the plurality of rows comprises plurality of lines;
   for each row of the plurality of rows, identify a respective plurality of lines comprised by the row;

identify a set of field types of one or more fields comprised by each line of the one or more lines comprised by the respective row;

detect, in each line of the plurality of lines, a set of fields corresponding to a respective set of field types; and extract information from the set of fields.

9. The system of claim 8, wherein the processing device is further configured to:

identify vertical boundaries of the tabular structure.

10. The system of claim 8, wherein identifying the plurality of rows further comprises:

identifying a plurality of lines of the tabular structure; and classifying each line of the plurality of lines.

11. The system of claim 8, wherein identifying the plurality of rows further comprises:

identifying a plurality of lines of the tabular structure; and clustering the plurality of lines into a plurality of clusters.

12. The system of claim 8, wherein identifying the set of field types further comprises:

determining, for each line of the one or more lines, a corresponding line type derived from a corresponding set of field types of the one or more fields comprised by the line.

13. The system of claim 8, wherein the processing device is further configured to:

detecting a multi-line field by grouping two or more single-line field portions.

14. The system of claim 8, wherein the processing device is further configured to:

train a table detection classifier for detecting one or more tabular structures within a document;

train a vertical boundary detection classifier for identifying vertical boundaries of the one or more tabular structures;

train a row detection classifier for determining a row layout of the one or more tabular structures;

train a line classifier for extracting information from the fields of the one or more tabular structures;

train a field detection module for detecting fields of the one or more tabular structures.

15. A non-transitory computer-readable storage medium including executable instructions that, when executed by a computing system, cause the computing system to:

receive a document image;

detect a tabular structure within the document image;

identify a plurality of rows of the tabular structure, wherein each row of the plurality of rows comprises plurality of lines;

for each row of the plurality of rows, identify a respective plurality of lines comprised by the row;

identify a set of field types of one or more fields comprised by each line of the one or more plurality of lines comprised by the respective row;

detect, in each line of the plurality of lines, a set of fields corresponding to a respective set of field types; and extract information from the set of fields.

16. The non-transitory computer-readable storage medium of claim 15, wherein the tabular structure is provided by a table.

17. The non-transitory computer-readable storage medium of claim 15, further comprising executable instructions that, when executed by the computing system, cause the computing system to:

identifying vertical boundaries of the tabular structure.

18. The non-transitory computer-readable storage medium of claim 15, wherein identifying the plurality of rows further comprises:

identifying a plurality of lines of the tabular structure; and classifying each line of the plurality of lines.

19. The non-transitory computer-readable storage medium of claim 15, wherein identifying the plurality of rows further comprises:

identifying a plurality of lines of the tabular structure; and clustering the plurality of lines into a plurality of clusters.

20. The non-transitory computer-readable storage medium of claim 15, wherein identifying the set of field types further comprises:

determining, for each line of the one or more lines, a corresponding line type derived from a corresponding set of field types of the one or more fields comprised by the line.

* * * * *